United States Patent
Lin et al.

(10) Patent No.: US 8,641,293 B2
(45) Date of Patent: Feb. 4, 2014

(54) OPTICAL FIBER CONNECTOR AND APPARATUS OF FACILITATING TO PULL OUT OPTICAL FIBER CONNECTOR

(75) Inventors: Sung An Lin, Miaoli County (TW); Sung Chi Lin, Miaoli County (TW)

(73) Assignee: Ezontek Technologies Co., Ltd., New Taipei (TW)

( * ) Notice: Subject to any disclaimer, the term of this patent is extended or adjusted under 35 U.S.C. 154(b) by 106 days.

(21) Appl. No.: 13/450,566

(22) Filed: Apr. 19, 2012

(65) Prior Publication Data

US 2013/0216188 A1    Aug. 22, 2013

(30) Foreign Application Priority Data

Feb. 20, 2012    (TW) .............................. 101105477 A

(51) Int. Cl.
*G02B 6/38*    (2006.01)

(52) U.S. Cl.
USPC .................... 385/77; 385/53; 385/76; 385/78

(58) Field of Classification Search
USPC .......................................... 385/53, 76, 77, 78
See application file for complete search history.

(56) References Cited

U.S. PATENT DOCUMENTS

| | | | |
|---|---|---|---|
| 7,218,828 B2 * | 5/2007 | Feustel et al. ................. | 385/135 |
| 7,500,790 B2 | 3/2009 | Erdman et al. | |
| 7,526,172 B2 * | 4/2009 | Gniadek et al. ............... | 385/135 |
| 7,553,089 B2 | 6/2009 | Gurreri et al. | |

\* cited by examiner

*Primary Examiner* — Jennifer Doan

(57) ABSTRACT

An optical fiber connector according to the present disclosure includes a housing, a tab, a vertical portion, a horizontal portion and a handle member. According to the optical fiber connector of the present disclosure, wherein a pull at the handle member may pull out the optical fiber connector from the optical fiber adapter without need to press a tab on the optical fiber connector directly.

11 Claims, 5 Drawing Sheets

OPTICAL FIBER CONNECTOR AND APPARATUS OF FACILITATING TO PULL OUT OPTICAL FIBER CONNECTOR

CROSS REFERENCE TO RELATED APPLICATION

This application claims the priority benefit of Taiwan Patent Application Serial Number 101105477 filed Feb. 20, 2012, the full disclosure of which is incorporated herein by reference.

BACKGROUND OF THE INVENTION

1. Field of the Invention

The present invention relates to an optical fiber connector and apparatus of facilitating to pull out optical fiber connector.

2. Description of the Related Art

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating (herein "mating device"). This way, the light from one fiber is optically coupled to the optical path of the mating device.

A typical connector comprises a housing containing a ferrule which holds one or more fibers. The ferrule is biased forward in the housing such that, when the connector is mated to the mating device, the fiber in the ferrule urges against the optical path of the mating device. There are many different prior art connectors currently available for establishing such optical connections, including, for example, SC, ST and FC connectors and more-recent "small form factor" designs such as MTRJ, MU, LC, MPX and MPO-type connectors.

Referring to FIG. 1, a conventional LC type optical fiber connector 100 has a generally rectangular shape with a square cross section. The connector 100 includes a rectangular hollow housing 110 comprised of a top side-wall 111, a bottom side-wall 112, a right side-wall 113 and a left side-wall 114, wherein the right side-wall 113 faces the left side-wall 114 and connects with the bottom side-wall 112 and the top side-wall 111. A latch 120 is molded into the top side-wall 111 and includes a living hinge 125 which allows a tab 126 to be moved up and down in a direction perpendicular to the central axis of the connector 100. The latch 120 includes a pair of protrusions 121 that are positioned on opposing sides of the tab 126. In addition, a ferrule 140 protrudes from a circular opening 116 on the front end of the housing 110. A spring is located inside the housing 110 to allow the ferrule 140 to move back and forth through the opening 116 (not shown in the figure). A pair of protrusions 160 is positioned on the right side-wall 113 and left side-wall 114, respectively. A rectangular opening 118 is formed on each of the right side-wall 113 and left side-wall 114. A boot 170 extends from a rear end of the housing 110.

Referring to FIG. 2, a conventional LC type optical fiber adapter 200, such as an LC duplex adapter includes a generally rectangular housing 210. The housing 210 has an axial cavity defined by a top side-wall 211, a bottom side-wall 212, a right side-wall 213 and a left side-wall 214. The axial cavity is divided into two halves by a compartment wall 215 that is parallel to the right side-wall 213 and left side-wall 214 and connects with the top side-wall 211 and bottom side-wall 212. The half of the axial cavity defined by the top side-wall 211, bottom side-wall 212, compartment wall 215 and right side-wall 213 is named as the right axial cavity and the other half of the axial cavity defined by the top side-wall 211, bottom side-wall 212, compartment wall 215 and left side-wall 214 is named as the left axial cavity. Each of the right and left axial cavities has an opening 208. A pair of indentations 220 mating with the protrusions 160 on the connector 100 is arranged in the left axial cavity on the left side-wall 214 and compartment wall 215, respectively. Similarly, the indentations 220 are also arranged in the right axial cavity on the right side-wall 213 and compartment wall 215, respectively. When the connector 100 of FIG. 1 is fully inserted into the adapter 200 through either of the openings 208, the protrusions 160 on the connector 100 will be placed in the indentations 220. Two hollow cylinders 240 are axially positioned in the right and left axial cavities respectively to receive the ferrule 140 of the connector 100. In addition, the adapter 200 further includes reciprocal locking mechanisms 230 which, referring to FIG. 1, mate with the latch 120, thereby securely interlocking the connector 100 with the adapter 200 when the connector 100 is completely inserted into the adapter 200. Afterward, a press on the tab 126 is necessary in order to pull the connector 100 out from the adapter 200.

However, when many the connector 100 are mounted on a panel with close spacing to each other, it is likely that there is no enough space for a user's fingers to press the tab 126 of the latch 120 and then pull out the connector 100.

Accordingly, there exists a need to provide a solution to solve the aforesaid problems.

SUMMARY OF THE INVENTION

The present disclosure provides an apparatus of facilitating to pull out optical fiber connector, wherein a pull at the handle member may pull out the optical fiber connector from the optical fiber adapter without need to press the tab on the optical fiber connector directly.

In one embodiment, the apparatus of facilitating to pull out optical fiber connector according to the present disclosure includes a clip member and a handle member. The clip member includes a first horizontal portion, two first vertical portions, a second vertical portion and a second horizontal portion. The first horizontal portion is configured to be in contact with a top side-wall of a housing of the optical fiber connector. The first vertical portions extend downward from the first horizontal portion, wherein the first vertical portions are configured to be in contact with right and left side-walls of the housing of the optical fiber connector, respectively. The second vertical portion extends upward from the first horizontal portion. The second horizontal portion is formed on the second vertical portion, wherein the second horizontal portion has a width greater than that of the second vertical portion. The handle member includes a body, a handle connecting with the body, and a ring. The body has an opening formed thereon, wherein the second vertical portion is positioned within the opening, and the opening has a width smaller than that of the second horizontal portion of the clip member. The ring connects with the body and is positioned to enclose the tab of the optical fiber connector.

According to the apparatus of the present disclosure, wherein the handle member is flexible. A slit is formed on the body and is in communication with the opening. The slit is configured to allow the second horizontal portion to insert through the opening when the slit is pulled open to enlarge the opening.

According to the apparatus of the present disclosure, wherein the handle of the handle member is T-shaped.

According to the apparatus of the present disclosure, wherein the handle member has two protruding portions extending downward from two opposing sides of the body, respectively.

According to the apparatus of the present disclosure, wherein the clip member further includes a tab formed on the second horizontal portion. The tab on the second horizontal portion is configured to be pressed on the tab of the optical fiber connector.

According to the apparatus of the present disclosure, wherein the clip member further includes two protrusions formed on the first vertical portions, respectively. The two protrusions face each other.

The present disclosure further provides an optical fiber connector.

In one embodiment, the optical fiber connector according to the present disclosure includes a housing, a tab, a vertical portion, a horizontal portion and a handle member. The housing includes a top side-wall, a bottom side-wall, a right side-wall and a left side-wall, wherein the top side-wall faces the bottom side-wall and connects with the right and left side-walls. The tab extends from the top side-wall. The vertical portion extends upward from the top side-wall and the horizontal portion is formed on the vertical portion, wherein the horizontal portion has a width greater than that of the vertical portion. The handle member includes a body, a handle and a ring. The body has an opening formed thereon, wherein the vertical portion on the top side-wall is positioned within the opening and the opening has a width smaller than that of the horizontal portion. The handle connects with the body. The ring connects with the body, wherein the ring is positioned to enclose the tab on the top side-wall.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
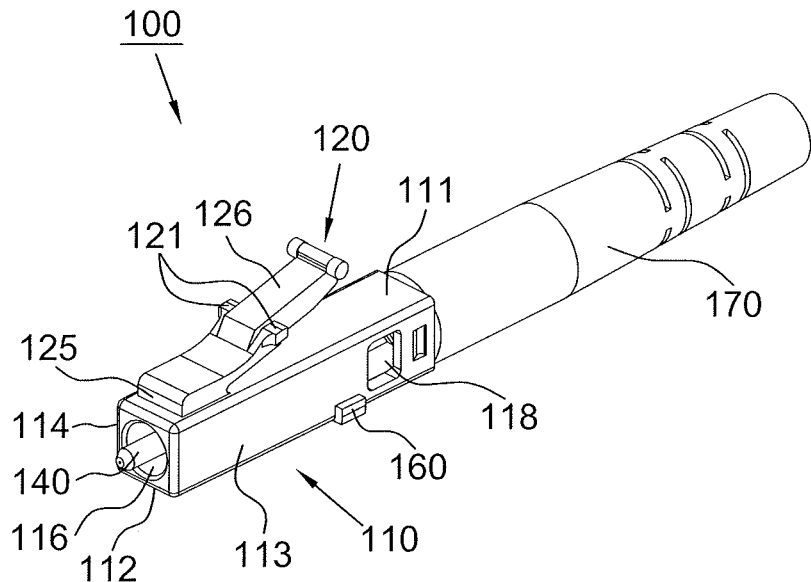
FIG. 1 is an elevated perspective view of a conventional LC type optical fiber connector.
Figure 2:
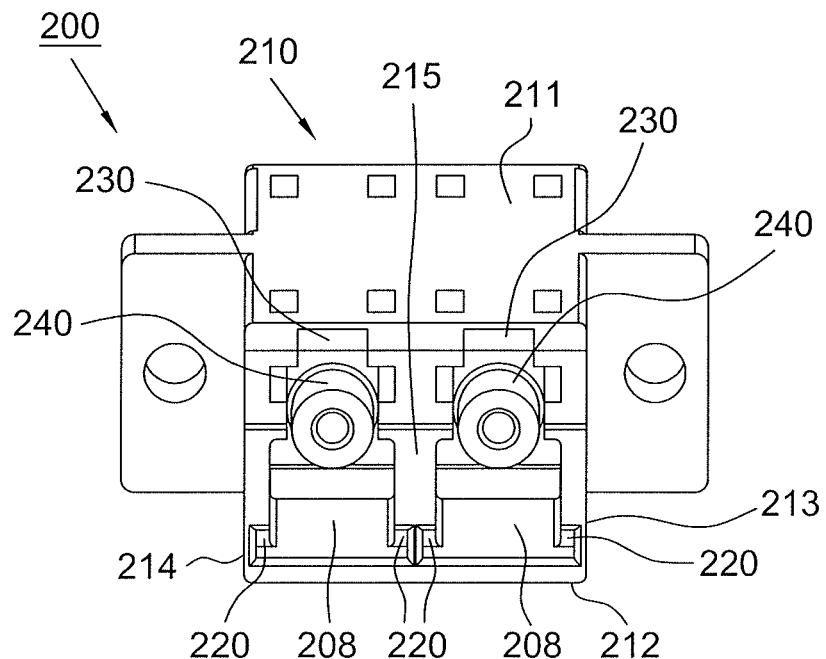
FIG. 2 is an elevated perspective view of a conventional duplex LC type optical fiber adapter.
Figure 3:
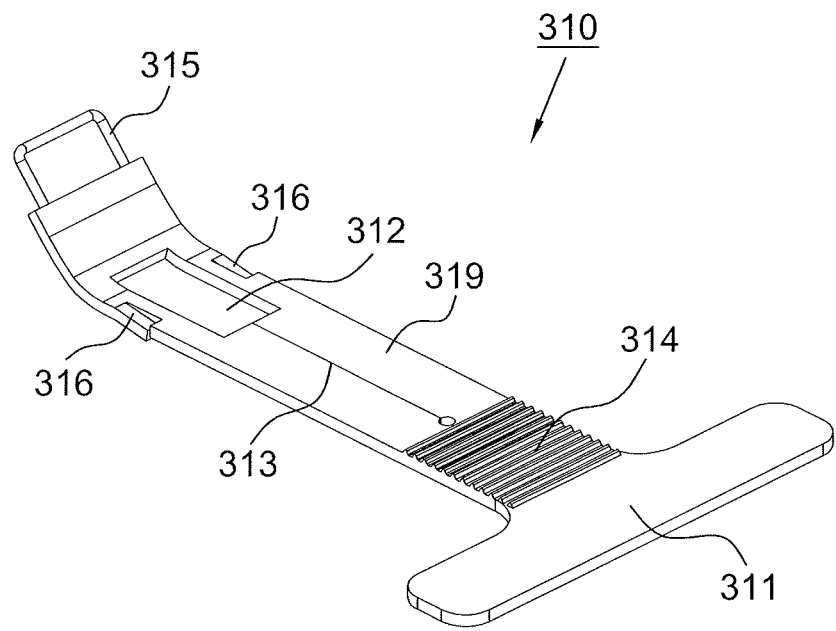
FIG. 3 is an elevated perspective view of the handle member of the apparatus of facilitating to pull out optical fiber connector according to the present disclosure.
Figure 4:
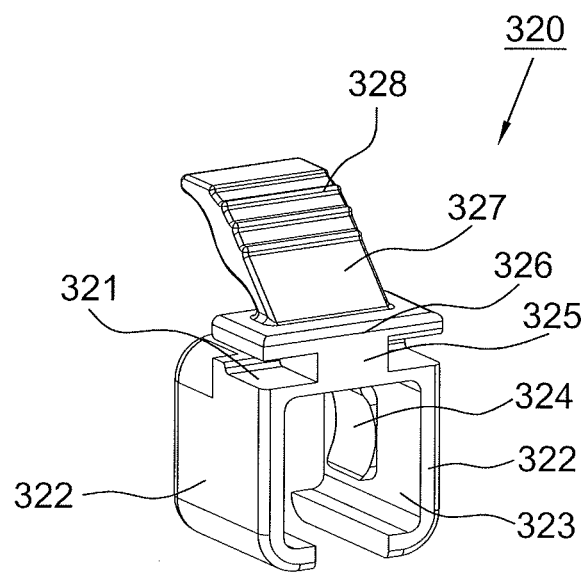
FIG. 4 is an elevated perspective view of the clip member of the apparatus of facilitating to pull out optical fiber connector according to the present disclosure.
Figure 5:
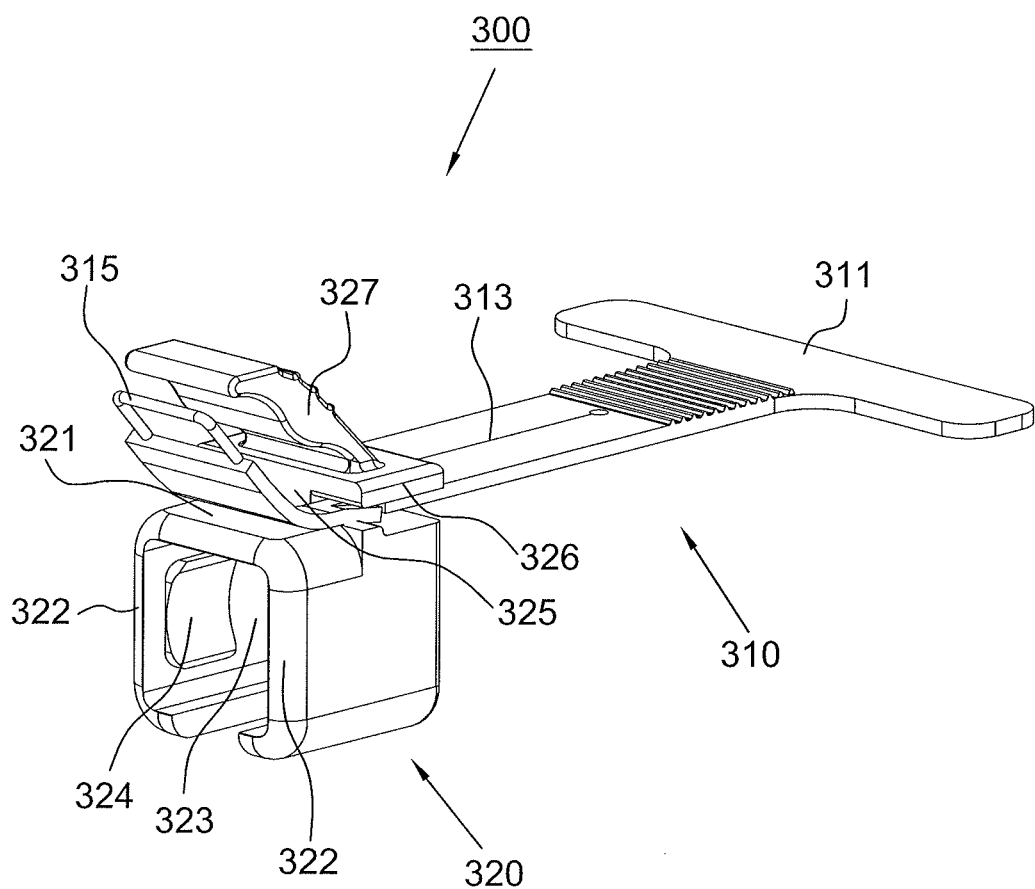
FIG. 5 is an elevated perspective view of the apparatus of facilitating to pull out optical fiber connector according to the present disclosure.

Referring to FIGS. 3, 4 and 5, the apparatus 300 of facilitating to pull out optical fiber connector includes a handle member 310 and a clip member 320. Referring to FIGS. 4 and 5, the clip member 320 is flexible and made from plastic material. The clip member 320 includes a pair of vertical portions 322 extend downward from a horizontal portion 321, wherein the horizontal portion 321 and vertical portions 322 together define an accommodation room 323. Two protrusions 324 facing each other are formed within the accommodation room 323 and on the vertical portions 322, respectively. A vertical portion 325 extends upward from the horizontal member 321 and a horizontal portion 326 is formed on the vertical portion 325, wherein the horizontal portion 326 has a width greater than that of the vertical portion 325, and the horizontal portion 326 and vertical portion 325 together have a cross section of "T" shape. A tab 327 extends from the horizontal portion 326 and has a rough surface 328 formed thereon.

Referring to FIGS. 3 and 5, the handle member 310 is flexible and made from plastic material. The handle member 310 includes a generally rectangular body 319. The body 319 has an upwarping front section and a rear section connecting with a T-shaped handle 311, wherein the handle 311 has a rough surface 314 formed thereon. An opening 312 is formed on the body 319, wherein the opening 312 has a width that is smaller than the width of the horizontal portion 326 and is greater than the width of the vertical portion 325 of the clip member 320. A slit 313 is formed on the body 319 in a lengthwise direction, wherein the slit 313 is in communication with the opening 312. A U-shaped ring 315 is provided at the front section of the body 319. Two protruding portions 316 extend downward from two opposing sides of the body 319, respectively.

When desiring to mount the handle member 310 and clip member 320 at the optical fiber connector 100, the handle member 310 and clip member 320 may be first assembled together. The way of assembling the above two elements together is to pull open the slit 313 to enlarge the opening 312 and then to insert the tab 327 and horizontal portion 326 of the clip member 320 through the enlarged opening 312. Afterward, the pulling force exerted on the body 319 is removed and the vertical portion 325 is placed within the opening 312. FIG. 5 illustrates the apparatus 300 of the present disclosure.

Figure 6:
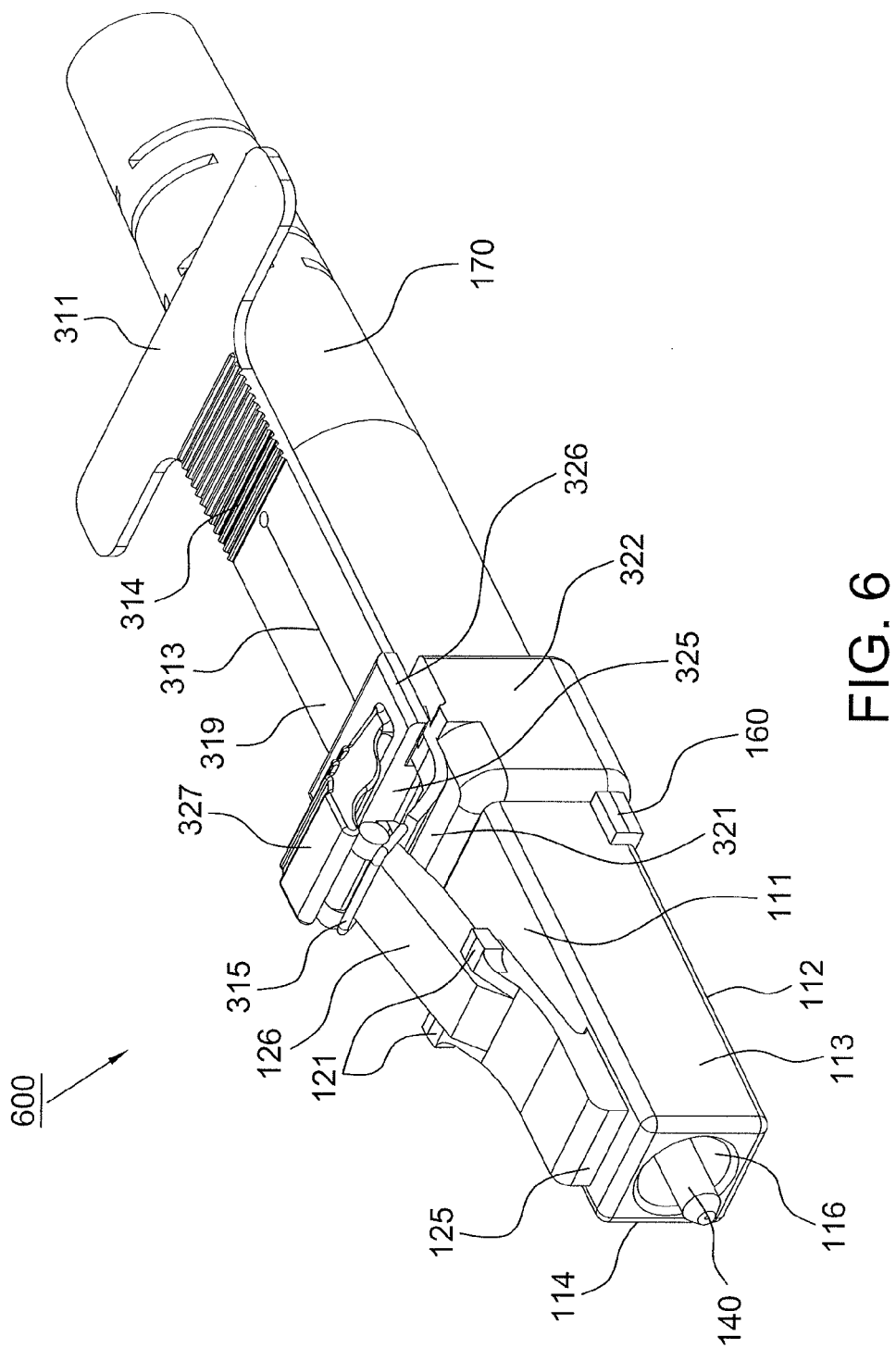
FIG. 6 is an elevated perspective view of the optical fiber connector according to the present disclosure.

After the handle member 310 and clip member 320 are assembled together, the clip member 320 is forced to clip to the housing 110 of the optical fiber connector 100 and the U-shaped ring 315 of the handle member 310 is forced to enclose the tab 126 of the connector 100. When the clip member 320 clips to the connector 100, the horizontal portion 321 is positioned on the top side-wall 111 of the connector 100 and the vertical portions 322 are in tight contact with the right and left side-walls 113, 114, respectively. The protrusions 324 on the vertical portions 322 are positioned within the rectangular openings 118 on the right and left side-walls 113, 114 of the connector 100, respectively. FIG. 6 illustrates the optical fiber connector 600 of the present disclosure. In another embodiment, the clip member 320 of the optical fiber connector 600 may be bonded to the housing 110 of the connector 100. Specifically, the clip member 320 may be integrally formed with the housing 110.

According to the present disclosure, a pull at the handle member 310 may drive the clip member 320 to move when the apparatus 300 is mounted at the optical fiber connector 100. Since the protrusions 324 of the clip member 320 are positioned within the openings 118 on the housing 110, the protrusions 324 will be in contact with inner walls of the opening 118 when the handle member 310 is pulled. Therefore, the clip member 320 is not pulled out from the connector 100.

Figure 7:
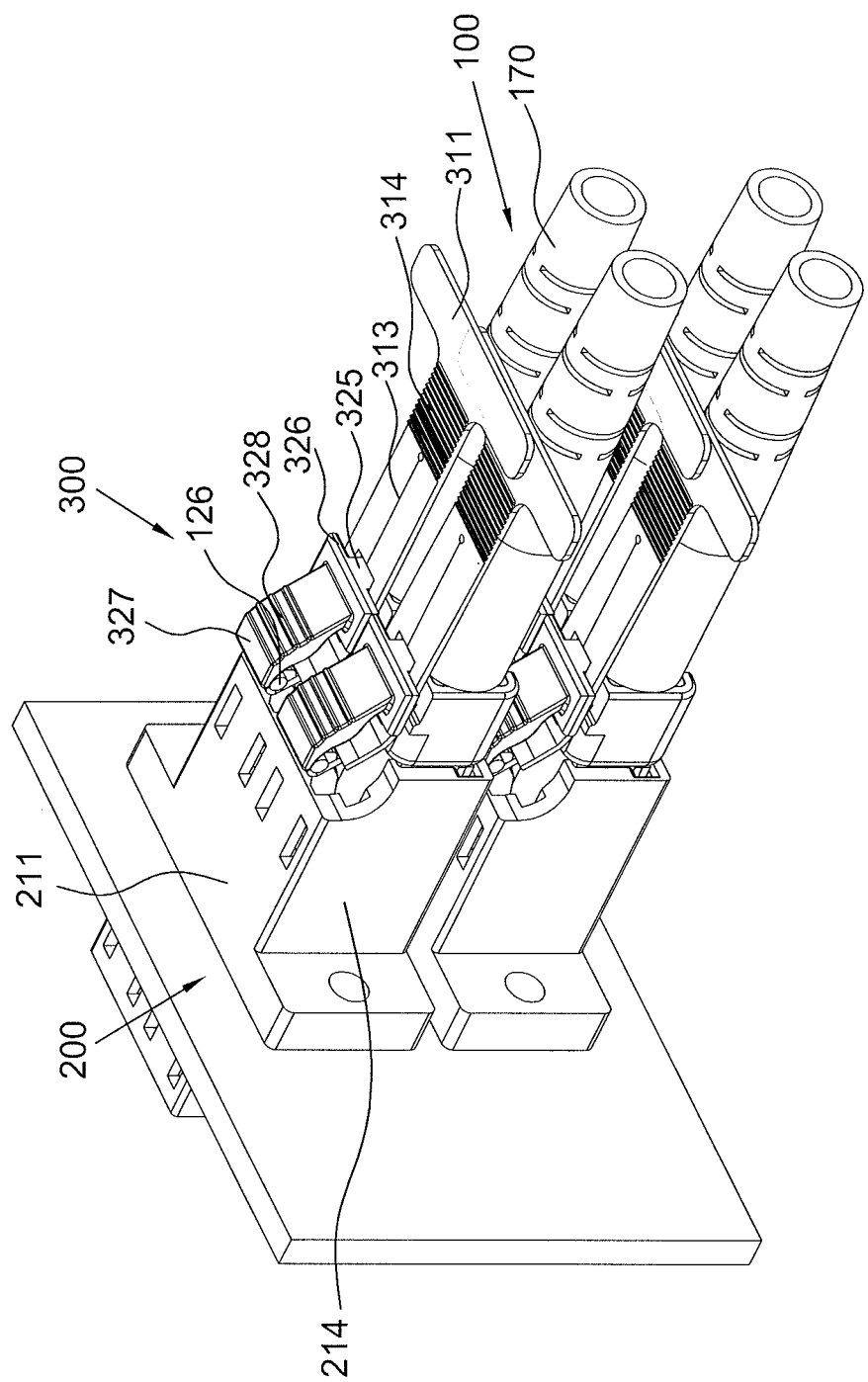
FIG. 7 is an elevated perspective view illustrating that the optical fiber connectors of the present disclosure are inserted into optical fiber adapters.

Referring to FIGS. 6 and 7, when the apparatus 300 of the present disclosure is mounted at the connector 100, a pull at the handle 311 of the handle member 310 may pull out the connector 100 from the optical fiber adapter 200. When a pull is exerted at the handle 311, the U-shaped ring 315 will is driven to pull the tab 126 of the connector 100. Since the pull of the U-shaped ring 315 will also cause the tab 126 to be pressed down, the latch 120 on the connector 100 will be unlocked from the reciprocal locking mechanism 230 of the adapter 200. If the pull at the handle 311 is continued, the protrusions 324 of the clip member 320 will drive the connector 100 to move to cause the connector 100 to be pulled out from the adapter 200. In addition, the protruding portions 316 will be in contact with the horizontal portion 321 of the clip member 320 when the handle 311 is pulled. This arrangement may also help the handle member 310 pull the clip member 320. The rough surface 314 on the handle 311 is provided to increase a friction between a user's finger and the handle 311.

According to the present disclosure, when the apparatus 300 is mounted at the optical fiber connector 100, a pull at the handle member 310 may pull out the connector 100 from the optical fiber adapter 200 without need to press the tab 126 directly. Furthermore, since the tab 327 of the clip member 320 extends to being positioned above the tab 126 of the connector 100, a press on the tab 327 may press down the tab 126 to unlock the latch 120 of the connector 100 from the reciprocal locking mechanism 230 of the adapter 200.

According to the present disclosure, since the width of the opening 312 on the handle member 310 is smaller than that of the horizontal portion 326 of the clip member 320, the handle member 310 will not be separated from the clip member 320.

According to the apparatus of the present disclosure, a pull at the handle member may pull out the optical fiber connector from the optical fiber adapter without need to press the tab on the optical fiber connector directly. In addition, the apparatus of the present disclosure may be mounted at a regular optical fiber connector. There is no need to use a special optical fiber connector at which the apparatus of the present disclosure may mount.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber connector, comprising:
    a housing having a top side-wall, a bottom side-wall, a right side-wall and a left side-wall, wherein the top side-wall faces the bottom side-wall and connects with the right and left side-walls;
    a first tab extending from the top side-wall of the housing;
    a vertical portion extending upward from the top side-wall;
    a horizontal portion formed on the vertical portion, wherein the horizontal portion has a width greater than the width of the vertical portion; and
    a handle member, comprising:
        a body having an opening formed thereon, wherein the vertical portion on the top side-wall is positioned within the opening, and the opening has a width smaller than the width of the horizontal portion;
        a handle connecting with the body; and
        a ring connecting with the body, wherein the ring is positioned to enclose the first tab on the top side-wall.

2. The optical fiber connector as claimed in claim 1, wherein the handle member is flexible, a slit is formed on the body and is in communication with the opening, the slit is configured to allow the horizontal portion to insert through the opening when the slit is pulled open to enlarge the opening.

3. The optical fiber connector as claimed in claim 1, wherein the handle of the handle member is T-shaped.

4. The optical fiber connector as claimed in claim 1, wherein the handle member has two protruding portions extending downward from two opposing sides of the body, respectively.

5. The optical fiber connector as claimed in claim 1, further comprising a second tab formed on the horizontal portion, wherein the second tab extends to being positioned above the first tab.

6. An apparatus of facilitating to pull out an optical fiber connector, the optical fiber connector includes a housing having a top side-wall, a bottom side-wall, a right-wall and a left side-wall, a tab extending from the top side-wall of the housing, the apparatus comprising:
    a clip member, comprising:
        a first horizontal portion configured to be in contact with the top side-wall of the housing:
        two first vertical portions extending downward from the first horizontal portion, the first vertical portions being configured to be in contact with the right and left side-walls, respectively;
        a second vertical portion extending upward from the first horizontal portion; and
        a second horizontal portion formed on the second vertical portion, wherein the second horizontal portion has a width greater than the width of the second vertical portion; and
    a handle member, comprising:
        a body having an opening formed thereon, wherein the second vertical portion is positioned within the opening, and the opening has a width smaller than the width of the second horizontal portion of the clip member;
        a handle connecting with the body; and
        a ring connecting with the body, wherein the ring is positioned to enclose the tab of the optical fiber connector.

7. The apparatus as claimed in claim 6, wherein the handle member is flexible, a slit is formed on the body and is in communication with the opening, the slit is configured to allow the second horizontal portion to insert through the opening when the slit is pulled open to enlarge the opening.

8. The apparatus as claimed in claim 6, wherein the handle of the handle member is T-shaped.

9. The apparatus as claimed in claim 6, wherein the handle member has two protruding portions extending downward from two opposing sides of the body, respectively.

10. The apparatus as claimed in claim 6, wherein the clip member further comprises a tab formed on the second horizontal portion, and the tab on the second horizontal portion is configured to be pressed on the tab of the optical fiber connector.

11. The apparatus as claimed in claim 6, wherein the clip member further comprises two protrusions formed on the first vertical portions, respectively, the two protrusions face each other.

* * * * *